United States Patent
Yu et al.

(10) Patent No.: US 10,120,227 B2
(45) Date of Patent: Nov. 6, 2018

(54) DISPLAY PANEL, DISPLAY DEVICE, AND TILED DISPLAY DEVICE

(71) Applicant: Samsung Display Co., Ltd., Yongin-Si, Gyeonggi-Do (KR)

(72) Inventors: Sanghee Yu, Hwaseong-si (KR); Byung-chul Kim, Asan-si (KR); Jaehong Park, Seoul (KR); Won-gap Yoon, Suwon-si (KR); Youngjoo Jeon, Seoul (KR); Kyungseon Tak, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 97 days.

(21) Appl. No.: 15/147,266

(22) Filed: May 5, 2016

(65) Prior Publication Data
US 2017/0090260 A1    Mar. 30, 2017

(30) Foreign Application Priority Data
Sep. 30, 2015    (KR) .......................... 10-2015-0138127

(51) Int. Cl.
*G02F 1/1333*    (2006.01)
*G02F 1/1362*    (2006.01)
*G02F 1/1335*    (2006.01)

(52) U.S. Cl.
CPC .... *G02F 1/13336* (2013.01); *G02F 1/133512* (2013.01)

(58) Field of Classification Search
CPC .......................... G02F 1/13336; G02F 1/136286
See application file for complete search history.

(56) References Cited

U.S. PATENT DOCUMENTS

| 5,164,853 | A | * | 11/1992 | Shimazaki | ........ | G02F 1/133305 |
|   |   |   |   |   |   | 349/149 |
| 6,014,193 | A | * | 1/2000 | Taira | ................... | G02F 1/13336 |
|   |   |   |   |   |   | 345/90 |
| 2006/0044215 | A1 |   | 3/2006 | Brody et al. |   |   |
| 2007/0001927 | A1 |   | 1/2007 | Ricks et al. |   |   |
| 2009/0122475 | A1 | * | 5/2009 | Kim | ................. | G02F 1/133308 |
|   |   |   |   |   |   | 361/679.21 |

(Continued)

FOREIGN PATENT DOCUMENTS

| KR | 1020080027715 A | 3/2008 |
| KR | 1020080072368 A | 8/2008 |

(Continued)

*Primary Examiner* — Jia Pan
(74) *Attorney, Agent, or Firm* — Cantor Colburn LLP

(57) ABSTRACT

A display device includes a first display panel including a first base substrate, a second base substrate disposed on the first base substrate, and a first metal layer disposed on the first base substrate, and a second display panel including a third base substrate disposed on the same plane on which the first base substrate is disposed, a fourth base substrate disposed on the third base substrate and on the same plane on which the second base substrate is disposed, and a second metal layer disposed on the third base substrate, where the second display panel is disposed on one side of the first display panel, and the second base substrate and the third base substrate partially overlap each other when the first display panel and the second display panel are seen from a thickness direction thereof.

11 Claims, 11 Drawing Sheets

(56) References Cited

U.S. PATENT DOCUMENTS

| | | | |
|---|---|---|---|
| 2011/0141404 A1* | 6/2011 | Kim | G02F 1/13336 349/74 |
| 2012/0127405 A1* | 5/2012 | Lee | G02F 1/13336 349/106 |
| 2012/0140160 A1* | 6/2012 | Han | G02F 1/13336 349/144 |
| 2014/0313645 A1 | 10/2014 | Yoon et al. | |

FOREIGN PATENT DOCUMENTS

| | | |
|---|---|---|
| KR | 100922069 B1 | 10/2009 |
| KR | 1020120059575 A | 6/2012 |

* cited by examiner

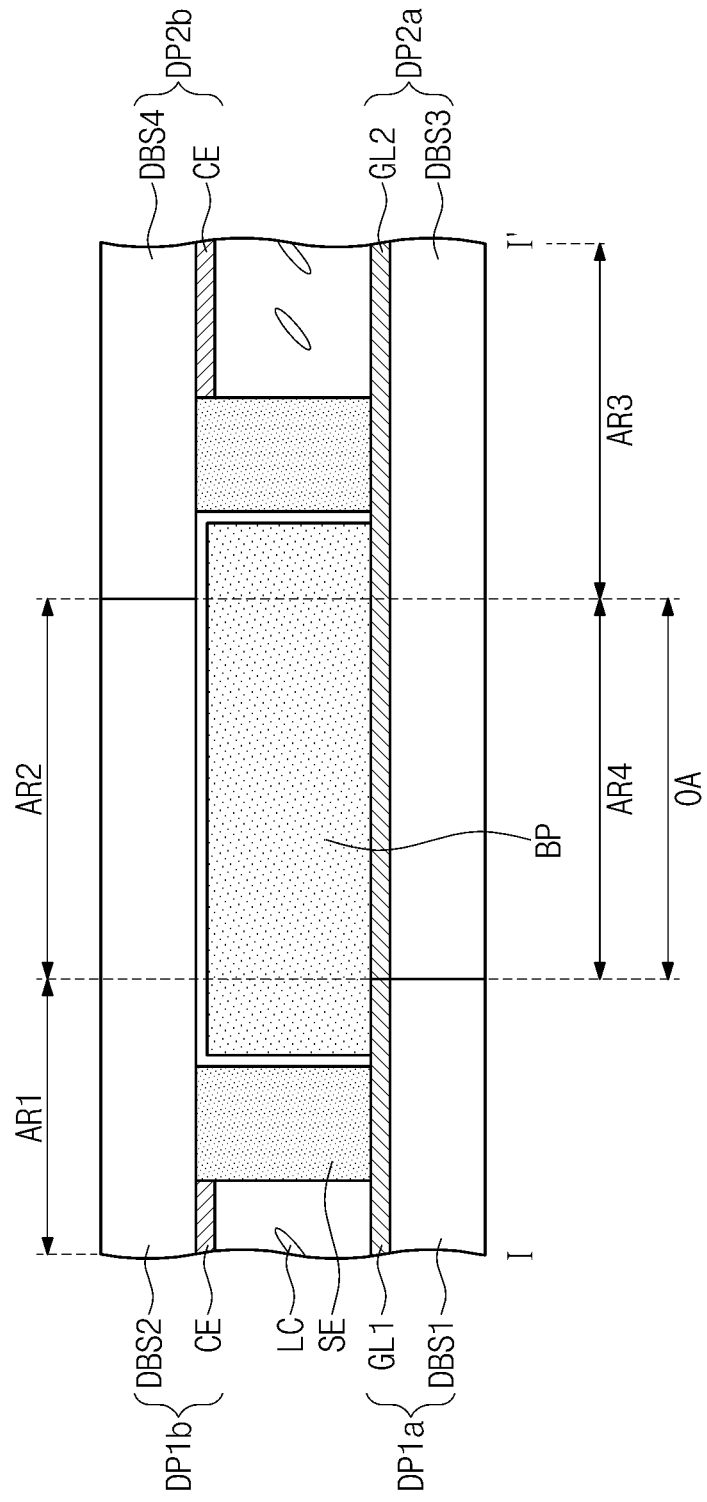

DISPLAY PANEL, DISPLAY DEVICE, AND TILED DISPLAY DEVICE

This application claims priority to Korean Patent Application No. 10-2015-0138127, filed on Sep. 30, 2015, and all the benefits accruing therefrom under 35 U.S.C. § 119, the content of which in its entirety is herein incorporated by reference.

BACKGROUND

1. Field

Exemplary embodiments of the invention herein relate to a display panel, a display device, and a tiled display device, and more particularly, to a display panel, a display device, and a tiled display device, which have reduced a bezel size.

2. Description of the Related Art

Various types of display devices used in multimedia devices, such as televisions, mobile phones, navigation systems, computer monitors, and video game systems, are being developed. The display devices provide users with images having predetermined information. Each of the display devices is generally divided into two regions, i.e., one region in which the images are displayed, and the other region in which the images are not displayed, on a front side. As the region in which the images are not displayed is reduced, the region in which the images are displayed increases, and thereby the display devices display larger images.

SUMMARY

The invention provides a display panel, a display device, and a tiled display device, which have reduced a bezel size.

A display device according to an exemplary embodiment of the invention may include a first display panel including a first base substrate, a first metal layer disposed on the first base substrate, and a second base substrate facing the first base substrate, with the first metal layer being disposed between the first base substrate and the second base substrate, and a second display panel including a third base substrate disposed on the same plane on which the first base substrate is disposed, a second metal layer disposed on the third base substrate, and a fourth base substrate facing the third base substrate and disposed on the same plane on which the second base substrate is disposed, with the second metal layer being disposed between the third base substrate and the fourth base substrate, where the second display panel may be disposed on one side of the first display panel in a plan view, and the second base substrate and the third base substrate may partially overlap each other when the first display panel and the second display panel are seen from a thickness direction thereof.

In an exemplary embodiment, the second base substrate may be divided into a first region overlapping the first base substrate and a second region non-overlapping the first base substrate, the third base substrate may be divided into a third region overlapping the fourth base substrate and a fourth region non-overlapping the fourth base substrate, and an overlap region, in which the second region and the fourth region overlap each other, may be defined between the first region and the third region in the plan view.

In an exemplary embodiment, the first metal layer may include a first gate line extending in a first direction and a first data line extending in a second direction intersecting the first direction, the second metal layer may include a second gate line extending in the first direction and a second data line extending in the second direction, the first display panel and the second display panel may be disposed in parallel in the first direction, and the first gate line and the second gate line may be electrically connected to each other.

In an exemplary embodiment, the display device may further include a third display panel including a fifth base substrate disposed on the same plane on which the first base substrate is disposed, a third metal layer disposed on the fifth base substrate, and a sixth base substrate facing the fifth base substrate, with the third metal layer being disposed between the fifth base substrate and the sixth base substrate, the first display panel and the third display panel may be disposed in parallel in the second direction, and the second base substrate and the fifth base substrate partially may overlap each other.

In an exemplary embodiment, the third metal layer may include a third gate line extending in the first direction and a third data line extending in the second direction, and the first data line and the third data line may be electrically connected to each other.

In an exemplary embodiment, the display device may further include a conductive tape disposed on the first base substrate and the fifth base substrate, and the conductive tape may electrically connect the first data line and the third data line.

In an exemplary embodiment, the display device may further include a conductive tape disposed in the overlap region, and the conductive tape may be disposed on the first base substrate and the third base substrate, and electrically connect the first gate line and the second gate line.

In an exemplary embodiment, the display device may further include a light shielding member disposed in the overlap region, and the light shielding member may be disposed between the second base substrate and the third base substrate.

In an exemplary embodiment, the display device may further include an auxiliary liquid crystal layer disposed in the overlap region, and the auxiliary liquid crystal layer may be disposed between the second base substrate and the third base substrate.

A tiled display device according to an exemplary embodiment of the invention may include a first display panel and a second display panel. The first display panel may include a first substrate unit including a first base substrate, a first gate line disposed on the first base substrate, and a first data line disposed on the first base substrate, and a second substrate unit including a second base substrate, the second substrate being disposed on the first substrate unit and shifted in a predetermined direction with respect to the first substrate unit in the plan view, thereby being divided into a first region overlapping the first substrate unit and a second region non-overlapping the first substrate unit, and the second display panel may include a third substrate unit including a third base substrate, a second gate line disposed on the third base substrate, and a second data line disposed on the second base substrate, and a fourth substrate unit including a fourth base substrate, the fourth substrate unit being disposed on the third substrate unit and shifted in a predetermined direction with respect to the third substrate unit in the plan view, thereby partially overlapping the third substrate unit, where the third base substrate may be divided into a third region overlapping the fourth substrate unit and a fourth region non-overlapping the fourth substrate unit in the plan view, and the second region may partially overlap the fourth region in the plan view.

In an exemplary embodiment, the first display panel may be adjacent to and disposed next to the second display panel, the third substrate unit may be disposed next to the first substrate unit, the second substrate unit may be disposed on the first substrate unit and the third substrate unit, and the fourth substrate unit may be disposed next to the second substrate unit and on the third substrate unit.

In an exemplary embodiment, an overlap region, in which the second region and the fourth region overlap each other, may be defined between the first region and the third region in the plan view.

In an exemplary embodiment, the tiled display device may further include a light shielding member disposed in the overlap region, and the light shielding member may be disposed between the second substrate unit and the third substrate unit.

In an exemplary embodiment, the tiled display device may further include a conductive tape disposed in the overlap region, and the conductive tape may be adhered to the first substrate unit and the third substrate unit.

In an exemplary embodiment, the conductive tape electrically may connect the first gate line of the first substrate unit and the second gate line of the third substrate unit, or may electrically connect the first data line of the first substrate unit and the second data line of the third substrate unit.

In an exemplary embodiment, the tiled display device may further include an auxiliary liquid crystal layer disposed in the overlap region, and the auxiliary liquid crystal layer may be disposed between the second substrate unit and the third substrate unit.

In an exemplary embodiment, the tiled display device may further include a support member disposed in the overlap region, and the support member may be disposed between the second substrate unit and the third substrate unit.

A display panel according to an exemplary embodiment of the invention may include a first base substrate having a rectangular shape, a second base substrate disposed on the first base substrate and having a rectangular shape, and a liquid crystal layer disposed between the first base substrate and the second base substrate, where one vertex among four vertices of the first base substrate may overlap the second base substrate, and remaining three vertices among the four vertices may not overlap the second base substrate in the plan view, and one vertex among four vertices of the second base substrate may overlap the first base substrate, and remaining three vertices among the four vertices do not overlap the first base substrate in the plan view.

In an exemplary embodiment, the first base substrate may include two edges extending in a first direction and the other two edges extending in a second direction orthogonal to the first direction, and the second base substrate may include two edges extending in the first direction and the other two edges extending in the second direction.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 6 is a cross-sectional view of another exemplary embodiment of the display panel taken along line I-I' in FIG. 2;

DETAILED DESCRIPTION

Figure 1:
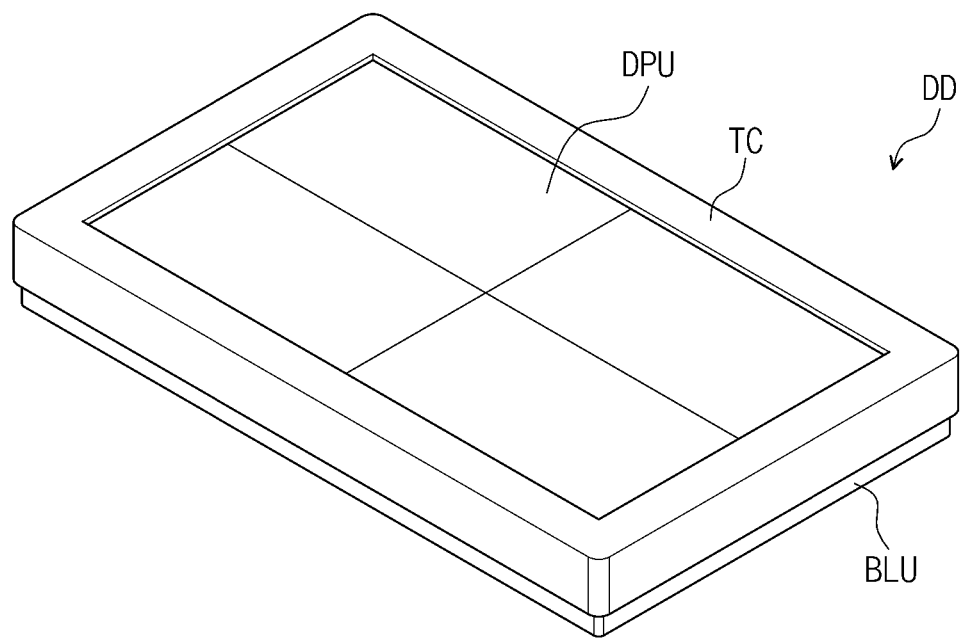
FIG. 1 is a perspective view of an exemplary embodiment of a display device according to the invention.

The invention may have various forms and various modifications may be made thereto, and thus specific embodiments will be illustrated in the drawings and described in detail in the detailed description. However, it is not intended to limit the invention to specific forms disclosed, but it should be understood that the invention includes any modification, equivalent, and substitute without departing from the spirit and scope of the invention. Other parts irrelevant to the invention were omitted in the drawings in order to clarify the description of the invention, and the same reference symbols refer to like parts throughout the specification.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, preferred embodiments of the invention will be described with reference to the accompanying drawings to fully explain the invention in such a manner that it may easily be carried out by those skilled in the art.

Figure 2:
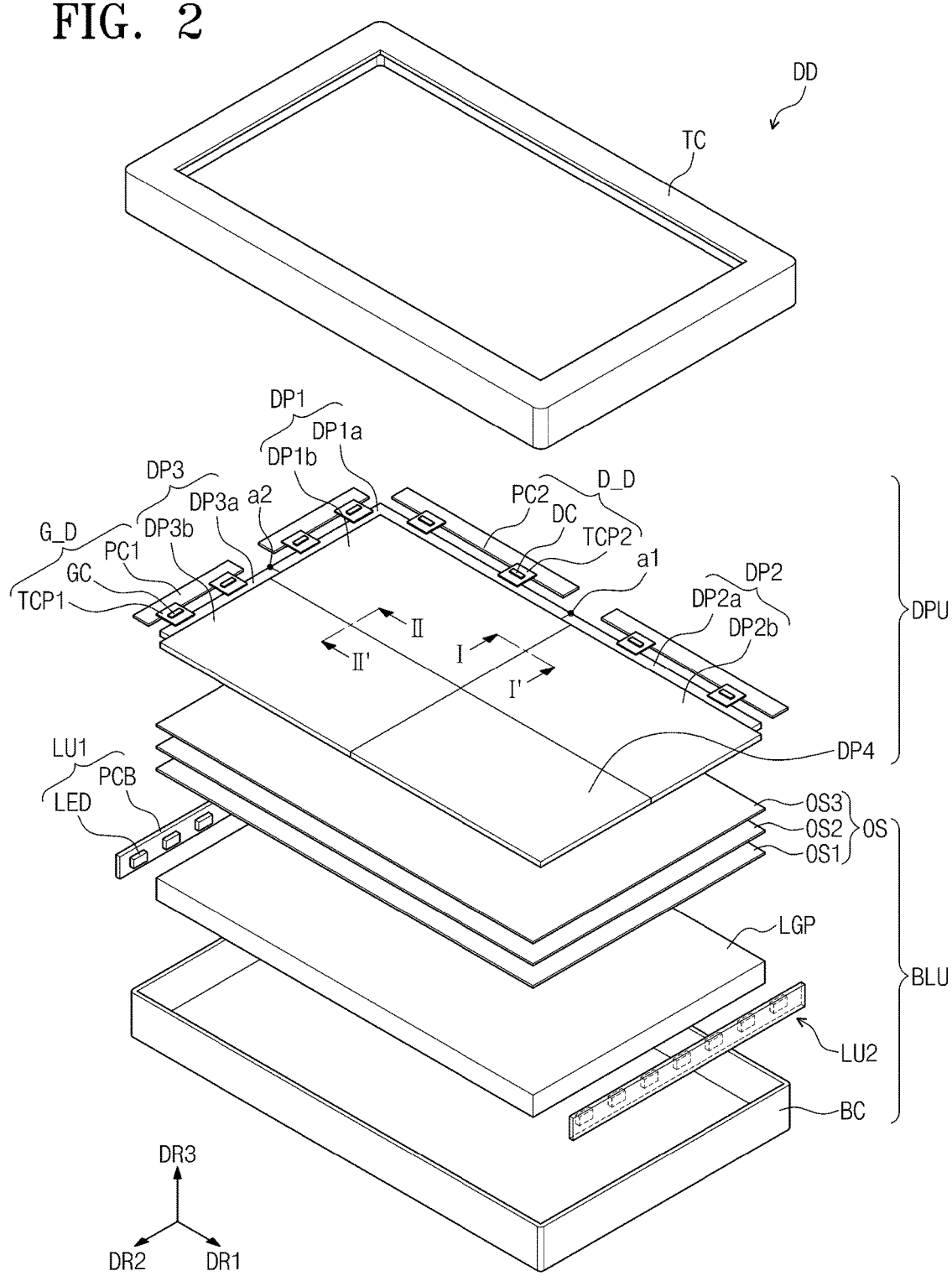
FIG. 2 is an exploded perspective view of an exemplary embodiment of a display device according to the invention.

FIG. 1 is a perspective view of a display device according to an exemplary embodiment of the invention, and FIG. 2 is an exploded perspective view of a display device according to an exemplary embodiment of the invention.

Referring to FIGS. 1 and 2, the display device DD may be applied to large electronic equipment such as outdoor exterior advertising boards and wall displays. However, these are exemplary, and the display device may be used in various other electronic devices.

The display device DD may include a display panel unit DPU, a top chassis TC, and a backlight unit BLU.

The display panel unit DPU may include a first display panel DP1, a second display panel DP2, a third display panel DP3, and a fourth display panel DP4. However, these are exemplarily illustrated, and the number of the display panels constituting the display panel unit DPU is not limited to 4. In an exemplary embodiment, the display panel unit DPU may include two or more display panels, for example.

The first display panel DP1, the second display panel DP2, the third display panel DP3, and the fourth display panel DP4 may be arranged in a tile-like manner. In an exemplary embodiment, the first display panel DP1 and the second display panel DP2 may be disposed in parallel in a first direction DR1, and the third display panel DP3 and the fourth display panel DP4 may be disposed in parallel in the first direction DR1, for example. The first display panel DP1 and the third display panel DP3 may be disposed in parallel in a second direction DR2 intersecting the first direction DR1, and the second display panel DP2 and the fourth display panel DP4 may be disposed in parallel in the second direction DR2. The first direction DR1 and the second direction DR2 may be orthogonal to each other.

The first display panel DP1 may include a first substrate unit DP1a and a second substrate unit DP1b. The second substrate unit DP1b may be disposed on the first substrate unit DP1a. The second substrate unit DP1b may be shifted in a predetermined direction with respect to the first substrate unit DP1a. The second display panel DP2 may include a third substrate unit DP2a and a fourth substrate unit DP2b. The fourth substrate unit DP2b may be disposed on the third substrate unit DP2a. The fourth substrate unit DP2b may be shifted in a predetermined direction with respect to the third substrate unit DP2a. The third display panel DP3 may include a fifth substrate unit DP3a and a sixth substrate unit DP3b. The sixth substrate unit DP3b may be disposed on the fifth substrate unit DP3a. The sixth substrate unit DP3b may be shifted in a predetermined direction with respect to the fifth substrate unit DP3a. The fourth display panel DP4 may include a seventh substrate unit DP4a (refer to FIG. 3) and an eighth substrate unit DP4b (refer to FIG. 3). The eighth substrate unit DP4b (refer to FIG. 3) may be disposed on the seventh substrate unit DP4a (refer to FIG. 3). The eighth substrate unit DP4b (refer to FIG. 3) may be shifted in a predetermined direction with respect to the seventh substrate unit DP4a (refer to FIG. 3).

When the display panel unit DPU is seen from a third direction DR3, which is a thickness direction (e.g., the third direction DR3) of the display panel unit DPU, the first to fourth display panels DP1, DP2, DP3, and DP4 each may partially overlap each other. This will be described in more detail with reference to FIGS. 3 and 4.

A gate driver G_D may be disposed on one edge of the display panel unit DPU, and a data driver D_D may be disposed on another edge thereof. The gate driver G_D may include a driving chip GC, a flexible circuit board TCP1 on which the driving chip GC is mounted, and a main circuit board PC1 which is connected to the display panel unit DPU through the flexible circuit board TCP1. The data driver D_D may include a driving chip DC, a flexible circuit board TCP2 on which the driving chip DC is mounted, and a main circuit board PC2 which is connected to the display panel unit DPU through the flexible circuit board TCP2. In FIG. 2, the gate driver G_D and the data driver D_D are exemplarily illustrated as a tape carrier package type, but not limited thereto. In an exemplary embodiment, the data driver D_D may be mounted in a chip-on-glass ("COG") type on the first substrate unit DP1a and the third substrate unit DP2a, for example. In an exemplary embodiment, the gate driver G_D may be mounted in an Amorphous Silicon TFT Gate driver circuit ("ASG") type on the first substrate unit DP1a and the fifth substrate unit DP3a through a thin film process, for example.

The first to fourth display panels DP1, DP2, DP3, and DP4 are electrically connected at adjacent parts of each other, and thus all of the first to fourth display panels DP1, DP2, DP3, and DP4 may not be necessarily provided with the gate driver G_D and the data driver D_D. Therefore, the spacing of a non-display region between the first to fourth display panels DP1, DP2, DP3, and DP4 may be further reduced.

The backlight unit BLU may provide the display panel unit DPU with light. The backlight unit BLU may include a light guide plate LGP, light source units LU1 and LU2, optical sheets OS, and a bottom chassis BC.

The light guide plate LGP, the light source units LU1 and LU2, and the optical sheets OS may be accommodated in the bottom chassis BC.

The light source units LU1 and LU2 may be disposed one side and another side of the light guide plate LGP. However, embodiments of the invention are not limited thereto. In an exemplary embodiment, only one light source unit LU1 may be provided to the backlight unit BLU, and the light source unit LU1 may be disposed only one side of the light guide plate LGP, for example.

Each of the light source units LU1 and LU2 may include a light source LED and a printed circuit board PCB. The light source LED may be mounted on the printed circuit board PCB, and may receive a driving voltage from the printed circuit board PCB. The light source LED, which received a driving voltage, may provide the light guide plate LGP with light. Although not illustrated, each of the light source units LU1 and LU2 may further include an extruded bar (not shown), which is attached the back surface of the printed circuit board PCB. The extruded bar may serve to release heat generated from the printed circuit board PCB and the light source LED to the outside.

The light guide plate LGP may receive light from the light source LED, and may guide the received light toward the display panel unit DPU. In an exemplary embodiment, materials constituting the light guide plate LGP may include at least any one of polyamide ("PA"), polymethyl methacrylate ("PMMA"), methyl methacrylate-styrene ("MS"), or polycarbonate ("PC"). However, the materials constituting the light guide plate LGP is not limited thereto, and may include various other elements.

The optical sheets OS may be disposed between the light guide plate LGP and the display panel unit DPU. The optical sheets OS may include a spread sheet OS1, a prism sheet OS2, and a protective sheet OS3. The spread sheet OS1 may spread light, and the prism sheet OS2 may focus light so that the travelling direction of the light spread by the spread sheet OS1 closes to the thickness direction (e.g., the third direction DR3) of the display panel unit DPU. The protective sheet OS3 may protect the prism sheet OS2 from external impact. In this embodiment, although each of the optical sheets OS is exemplarily provided with one spread sheet OS1, one prism sheet OS2, and one protective sheet OS3, embodiments of the invention are not limited thereto. In another embodiment of the invention, a plurality of at least any one of the spread sheet OS1, the prism sheet OS2, or the protective sheet OS3 may be laminated to provide the optical sheets OS, and at least any one sheet may be, when necessary, omitted, for example.

The top chassis TC may cover four edges of the display panel unit DPU, and may be coupled to the bottom chassis BC. According to this embodiment, the first to fourth display panels DP1, DP2, DP3, and DP4 constituting the display panel unit DPU overlap each other. Therefore, a top chassis covering the entire display panel unit DPU may be replaced instead of top chassis which respectively cover the first to fourth display panels DP1, DP2, DP3, and DP4. That is, since a top chassis is not disposed between adjacent display panels among the first to fourth display panels DP1, DP2, DP3, and DP4, the area of a non-display region between the adjacent display panels among the first to fourth display panels DP1, DP2, DP3, and DP4 may be reduced. As a result, even when a single display device DD is implemented with the first to fourth display panels DP1, DP2, DP3, and DP4, a phenomenon that the boundary between the first to fourth display panels DP1, DP2, DP3, and DP4 is visually recognized may be reduced.

Figure 3:
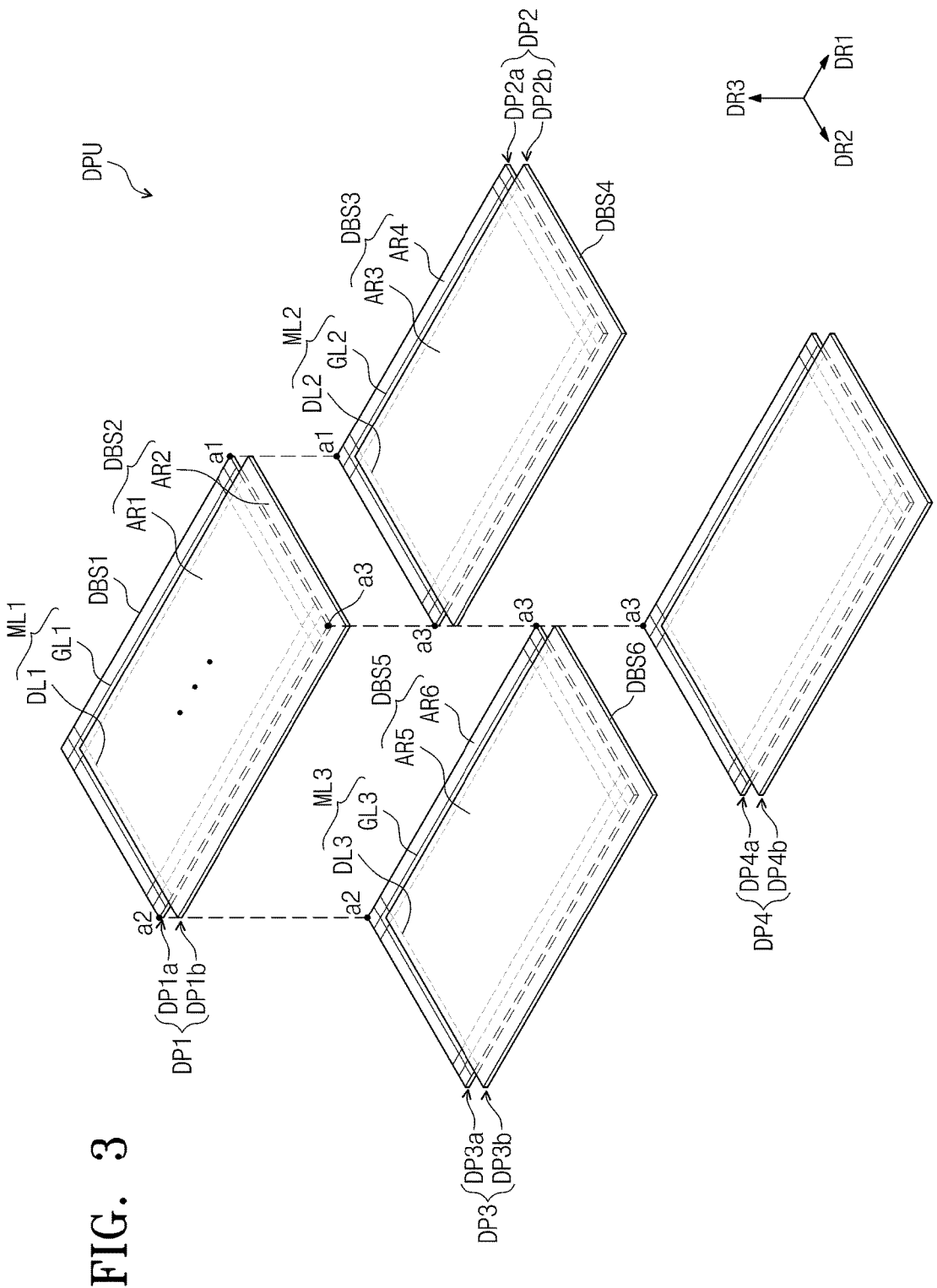
FIG. 3 is an exploded perspective view of an exemplary embodiment of a display panel unit according to the invention.

FIG. 3 is an exploded perspective view of a display panel unit DPU according to an exemplary embodiment of the invention.

Referring to FIG. 3, the first substrate unit DP1a may include a first base substrate DBS1 and a first metal layer ML1 disposed on the first base substrate DBS1. The first metal layer ML1 may include first gate lines GL1 extending in the first direction DR1 and first data lines DL1 extending in the second direction DR2. The second substrate unit DP1b may include a second base substrate DBS2 facing the first base substrate DBS1. Seen from the third direction DR3, the second base substrate DBS2 may include a first region AR1 overlapping the first substrate unit DP1a and a second region AR2 non-overlapping the first substrate unit DP1a.

The third substrate unit DP2a may include a third base substrate DBS3 and a second metal layer ML2 disposed on the third base substrate DBS3. The second metal layer ML2 may include second gate lines GL2 extending in the first direction DR1 and second data lines DL2 extending in the second direction DR2. The fourth substrate unit DP2b may include a fourth base substrate DBS4. Seen from the third direction DR3, the third base substrate DBS3 may include a third region AR3 overlapping the fourth substrate unit DP2b and a fourth region AR4 non-overlapping the fourth substrate unit DP2b.

The fifth substrate unit DP3a may include a fifth base substrate DBS5 and a third metal layer ML3 disposed on the fifth base substrate DBS5. The third metal layer ML3 may include third gate lines GL3 extending in the first direction DR1 and third data lines DL3 extending in the second direction DR2. The sixth substrate unit DP3b may include a sixth base substrate DBS6. Seen from the third direction DR3, the fifth base substrate DBS5 may include a fifth region AR5 overlapping the sixth substrate unit DP3b and a sixth region AR6 non-overlapping the sixth substrate unit DP3b.

The second substrate unit DP1b, the fourth substrate unit DP2b, the sixth substrate unit DP3b, and the eighth substrate unit DP4b may be shifted in the same direction from the first substrate unit DP1a, the third substrate unit DP2a, the fifth substrate unit DP3a, and the seventh substrate unit DP4a, respectively.

Referring to FIGS. 2 and 3, predetermined symbols a1, a2, and a3 are indicated at some of vertices of the first to eighth substrate units DP1a, DP1b, DP2a, DP2b, DP3a, DP3b, DP4a, and DP4b. When the first to fourth display panels DP1, DP2, DP3, and DP4 constituting the display panel unit DPU are coupled as illustrated in FIG. 2, vertices having the same symbol may be in contact with each other.

When the first to fourth display panels DP1, DP2, DP3, and DP4 are coupled as illustrated in FIG. 2, the first base substrate DBS1, the third base substrate DBS3, and the fifth base substrate DBS5 may be disposed on the same plane, and the second base substrate DBS2, the fourth base substrate DBS4, and the sixth base substrate DBS6 may be disposed on the same plane. Therefore, when the first to fourth display panels DP1, DP2, DP3, and DP4 are coupled, the level difference between the first to fourth display panels DP1, DP2, DP3, and DP4 may be minimized.

The second region AR2 in the second base substrate DBS2 may overlap a portion of the fourth region AR4 in the third base substrate DBS3 and a portion of the sixth region AR6 in the fifth base substrate DBS5. That is, adjacent panels among the first display panel DP1, the second display panel DP2, the third display panel DP3, and the fourth display panel DP4 may overlap each other.

Figure 4:
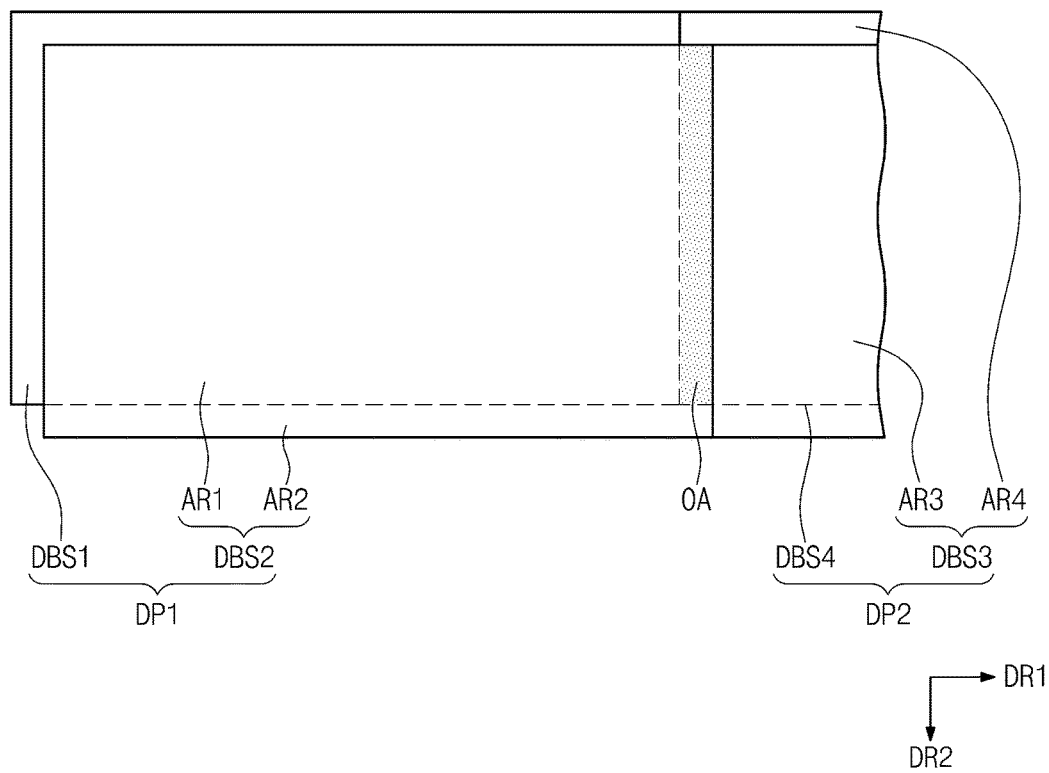
FIG. 4 is a plan view illustrating an exemplary embodiment of a portion of a display panel unit according to the invention.

FIG. 4 is a plan view illustrating a portion of a display panel unit according to an exemplary embodiment of the invention.

Referring to FIG. 4, the first display panel DP1 and the second display panel DP2 are illustrated. Seen from a plan view, an overlap region OA, in which the second region AR2 and the fourth region AR4 overlap each other, may be defined between the first region AR1 and the third region AR3.

On the overlap region OA, an adhesive material and the like may be disposed to couple two adjacent display panels DP1 and DP2. However, this is an example, and the overlap region OA may be utilized in various embodiments. Hereinafter, examples of the utilization of the overlap region OA will be described with reference to FIGS. 5A, 5B, and 6 to 9.

Figure 5A:
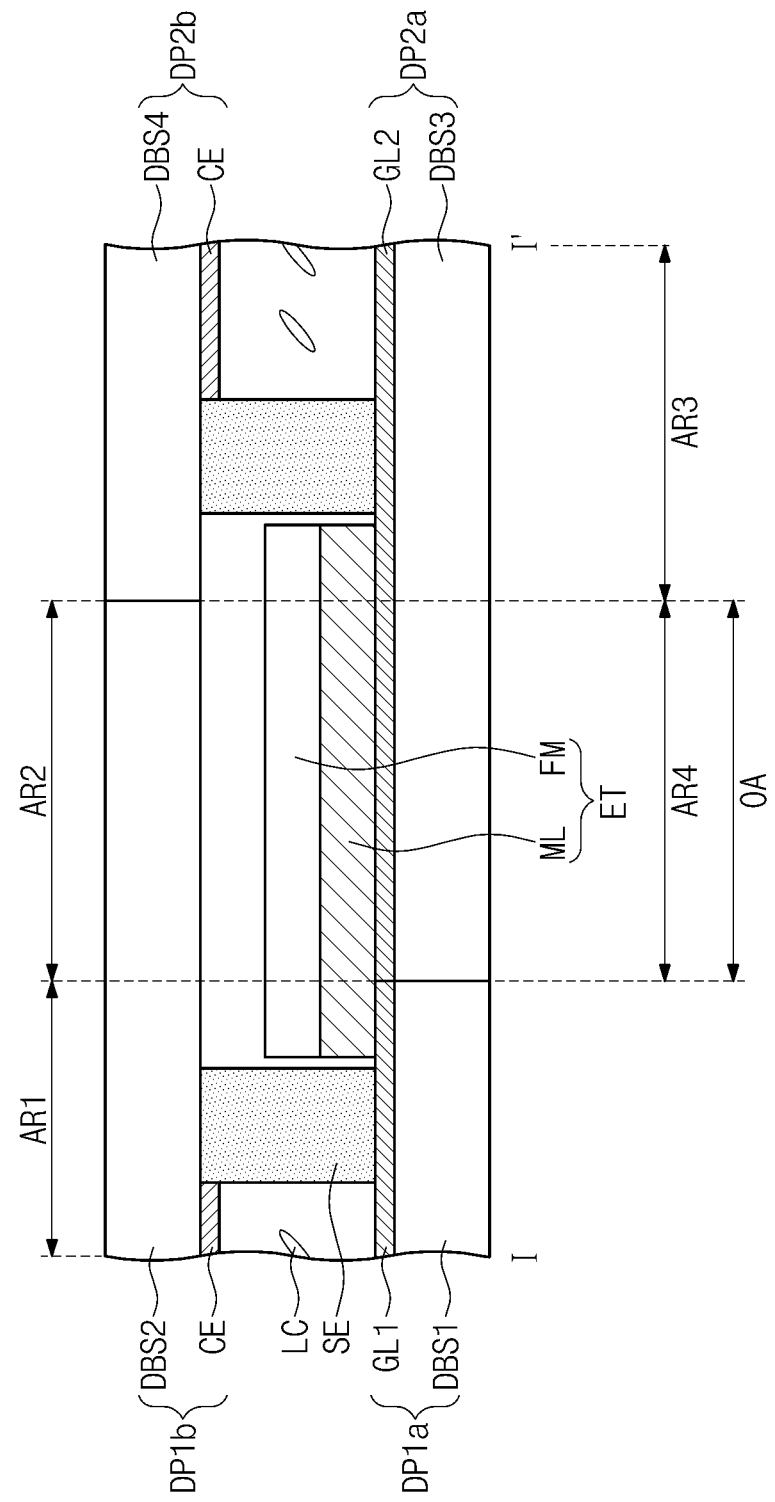
FIG. 5A is a cross-sectional view of the display panel taken along line I-I' in FIG. 2.
Figure 5B:
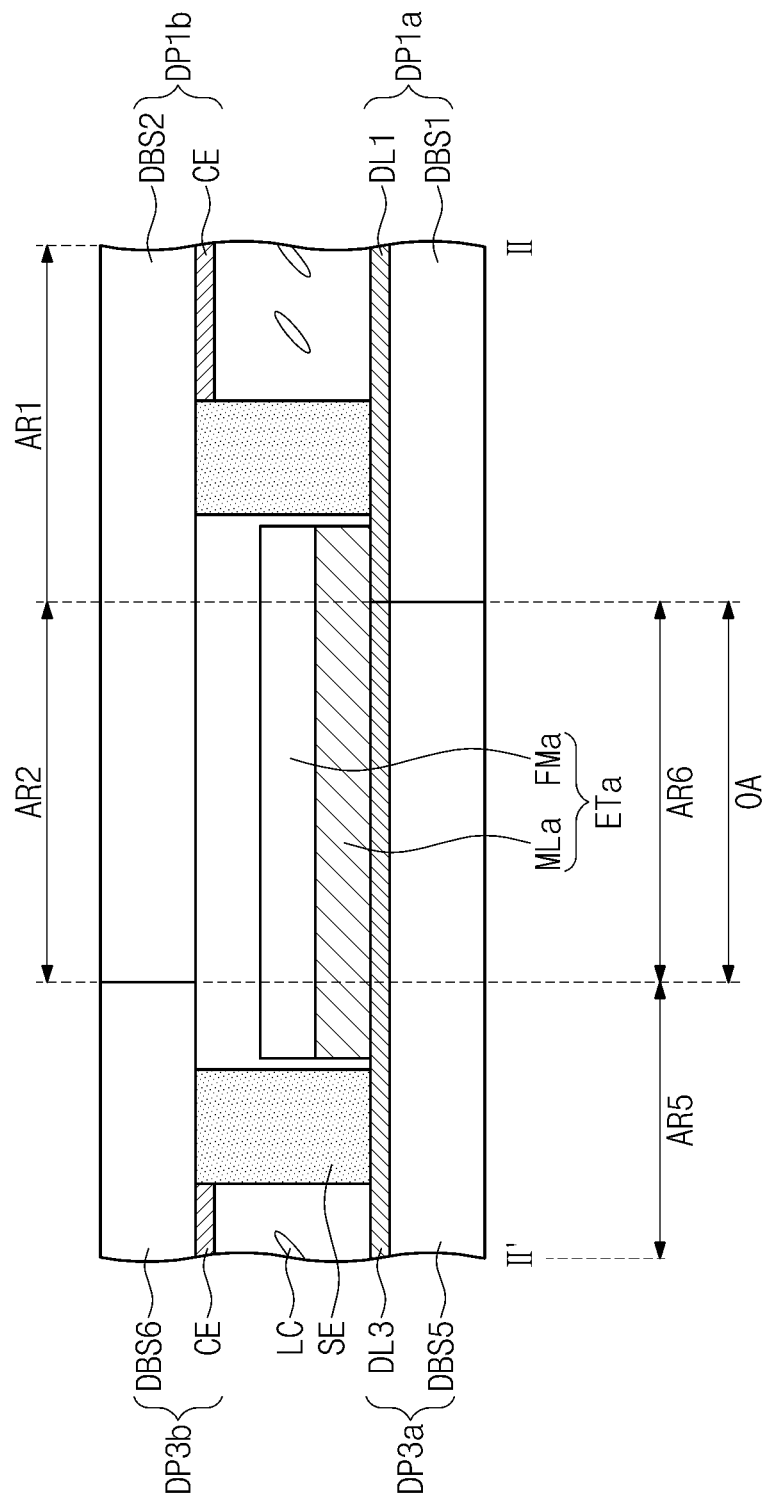
FIG. 5B is a cross-sectional view of the display panel taken along line II-II' in FIG. 2.

FIG. 5A is a cross-sectional view of the display panel taken along line I-I' in FIG. 2, and FIG. 5B is a cross-sectional view of the display panel taken along line II-II' in FIG. 2.

Referring to FIGS. 2, 5A, and 5B, a liquid crystal layer LC is disposed between the first substrate unit DP1a and the second substrate unit DP1b and between the third substrate unit DP2a and the fourth substrate unit DP2b, respectively. The liquid crystal layer LC may include a plurality of liquid crystal molecules of which the arrangement is changed according to an electric field generated between the first substrate unit DP1a and the second substrate unit DP1b and between the third substrate unit DP2a and the fourth substrate unit DP2b.

Each of the first substrate unit DP1a and the third substrate unit DP2a may include a pixel electrode (not shown), and each of the second substrate unit DP1b and the fourth substrate unit DP2b may include a common electrode CE. The pixel electrode and the common electrode CE may generate an electric field across the liquid crystal layer LC. In FIG. 5A, a common electrode CE of the first display panel DP1 and a common electrode CE of the second display panel DP2 are illustrated as not contacting each other. However, in another embodiment of the invention, common electrodes CE may be disposed on the entire surface of the second base substrate DBS2 and the fourth base substrate DBS4, and the common electrodes CE of the first display panel DP1 and the second display panel DP2 may thus be in contact with each other. Although not illustrated, any one of the first substrate unit DP1a and the second substrate unit DP1b and any one of the third substrate unit DP2a and the fourth substrate unit DP2b may include a color filter (not shown).

A sealant SE for sealing the liquid crystal layer LC may be disposed between the first substrate unit DP1a and the second substrate unit DP1b and between the third substrate unit DP2a and the fourth substrate unit DP2b. Therefore, a predetermined empty space may be defined between the second substrate unit DP1b and the third substrate unit DP2a within the overlap region OA.

The display device DD may further include a first conductive tape ET disposed within the empty space in the overlap region OA, and a second conductive tape ETa disposed within an empty space in a overlap region in which the first display panel DP1 and the third display panel DP3 overlap each other.

The first conductive tape ET may be disposed on the first base substrate DBS1 and the third base substrate DBS3, and may electrically connect the first gate lines GL1 and the second gate lines GL2. The second conductive tape ETa may be disposed on the first base substrate DBS1 and the fifth base substrate DBS5, and may electrically connect the first data lines DL1 and the third data lines DL3.

The first conductive tape ET may include a first film layer FM and a first metal layer ML printed on the first film layer FM, and the second conductive tape ETa may include a second film layer FMa and a second metal layer MLa printed on the second film layer FMa. The first metal layer ML may electrically connect each of the first gate lines GL1 and each of the second gate lines GL2, and the second metal layer MLa may electrically connect the first data lines DL1 and the third data lines DL3.

The first conductive tape ET may extend from the first display panel DP1 to the second display panel DP2, and may be adhered to the first display panel DP1 and the second display panel DP2. The second conductive tape ETa may extend from the first display panel DP1 to the third display panel DP3, and may be adhered to the first display panel DP1 and the third display panel DP3. According to this embodiment, by the first and second conductive tapes ET and ETa, data lines that are disposed in different display panels may be more stably connected to each other, and gate lines that are disposed in different display panels may be more stably connected to each other.

In FIGS. 5A and 5B, although the first conductive tape ET and the second conductive tape ETa each are illustrated as having a thickness less than the gap between the second substrate unit DP1b and the third substrate unit DP2a, embodiments of the invention are not limited thereto. In an exemplary embodiment, each thickness of the first conductive tape ET and the second conductive tape ETa may be substantially the same as the gap between the second substrate unit DP1b and the third substrate unit DP2a, for example.

FIG. 6 is a cross-sectional view of another exemplary embodiment of the display panel taken along line I-I' in FIG. 2.

Referring to FIGS. 2 and 6, the display device DD may further include a light shielding member BP disposed within the empty space in the overlap region OA. The light shielding member BP may include a light-absorbing material or a light-reflective material. In an exemplary embodiment, the light shielding member BP may include black pigment particles, for example. By means of the light shielding member BP, visual recognition of light supplied from the backlight unit BLU may be prevented at the boundary between the first display panel DP1 and the second display panel DP2.

In another embodiment of the invention, the light shielding member BP may have adhesive properties, and may be adhered to the first substrate unit DP1a and the third substrate unit DP2a to couple the first display panel DP1 with the second display panel DP2.

Unlike FIG. 6, in another embodiment of the invention, the light shielding member BP may further include a metal layer (not shown) printed on the bottom surface thereof. In this case, the metal layer may electrically connect the first gate line GL1 and the second gate line GL2.

Figure 7:
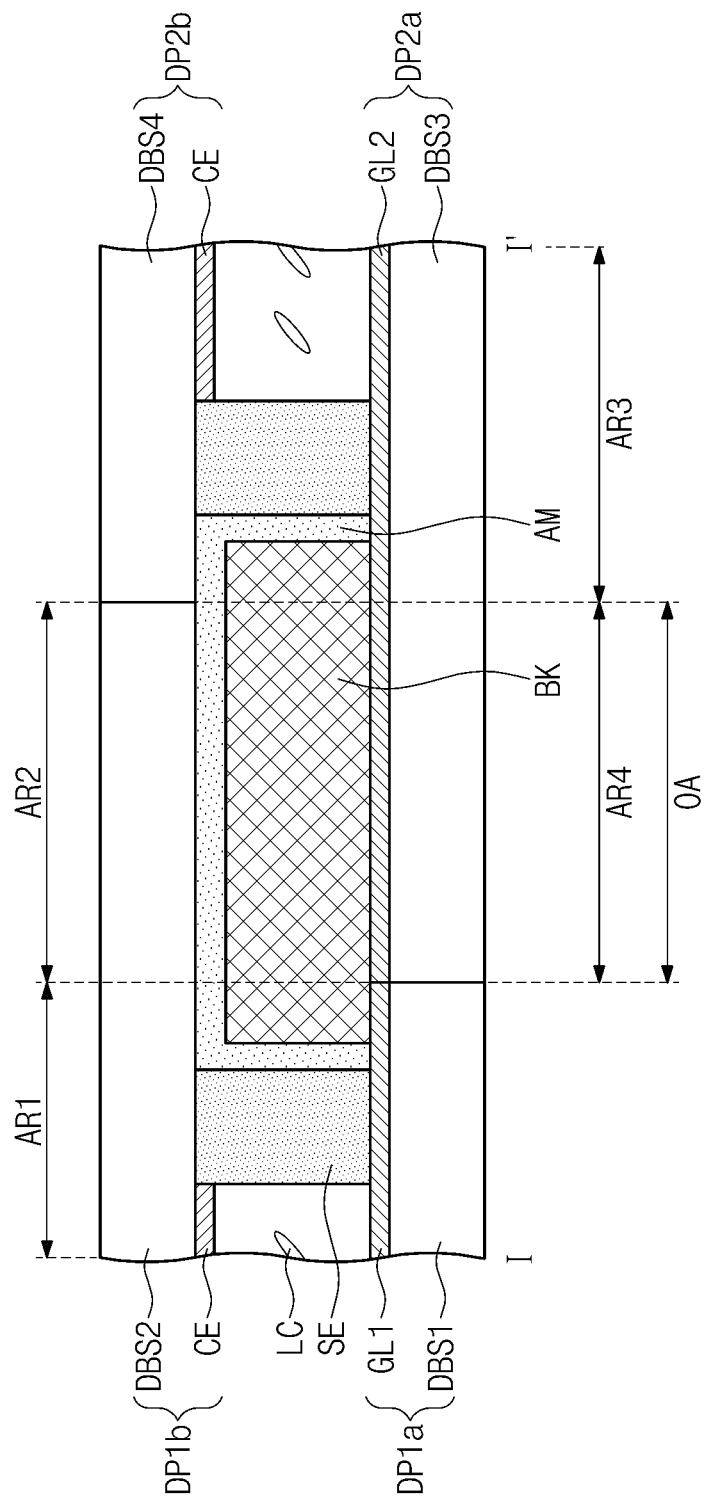
FIG. 7 is a cross-sectional view of another exemplary embodiment of the display panel taken along line I-I' in FIG. 2.

FIG. 7 is a cross-sectional view of another exemplary embodiment of the display panel taken along line I-I' in FIG. 2.

Referring to FIG. 7, the display device DD may further include a support member BK disposed within the empty space in the overlap region OA. The support member BK may fill the empty space in the overlap region OA, thereby being capable of improving rigidity of the overlap region OA in which the first display panel DP1 and the second display panel DP2 overlap each other.

The display device DD may further include a resin layer AM enclosing the support member BK. The resin layer AM is capable of providing more robust coupling between the first display panel DP1 and the second display panel DP2.

Figure 8:
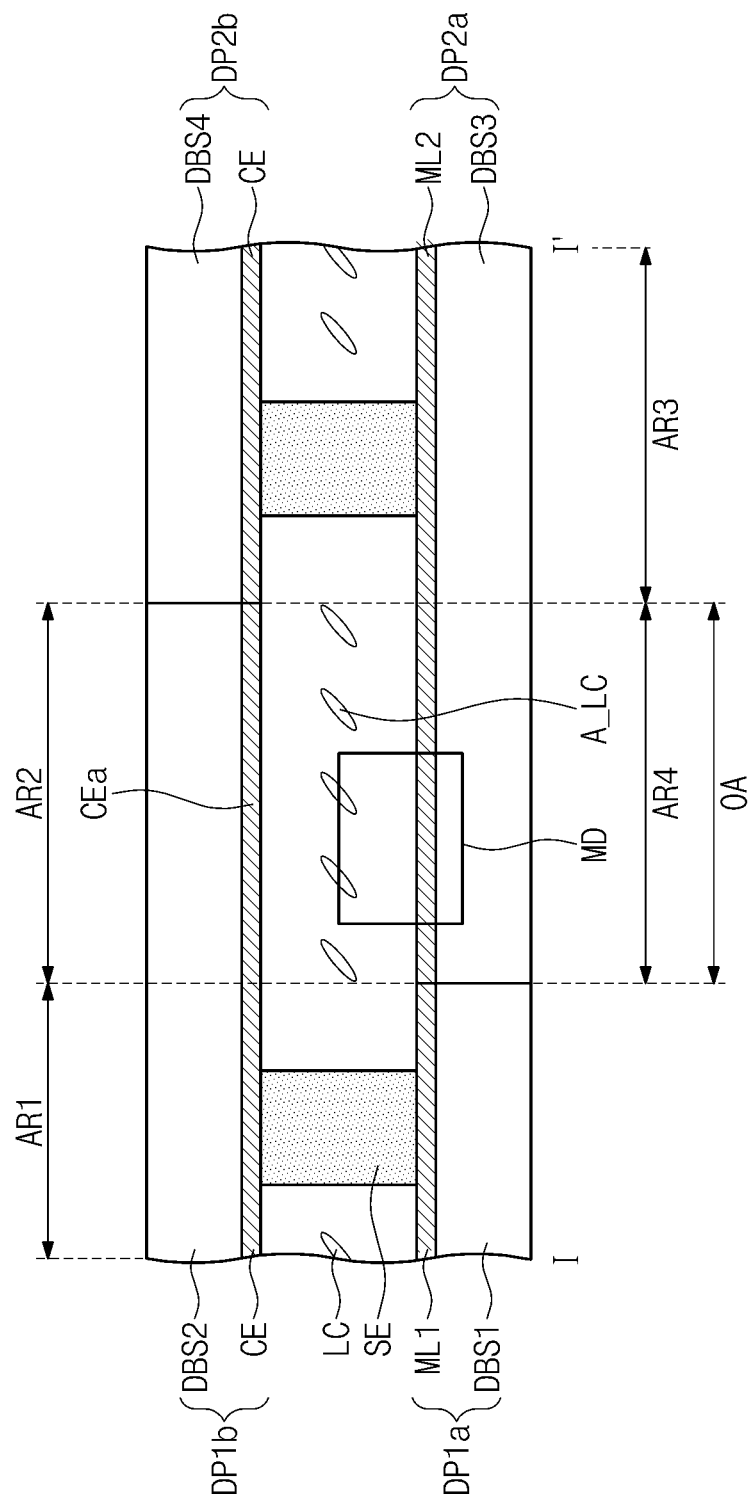
FIG. 8 is a cross-sectional view of another exemplary embodiment of the display panel taken along line I-I' in FIG. 2.
Figure 9:
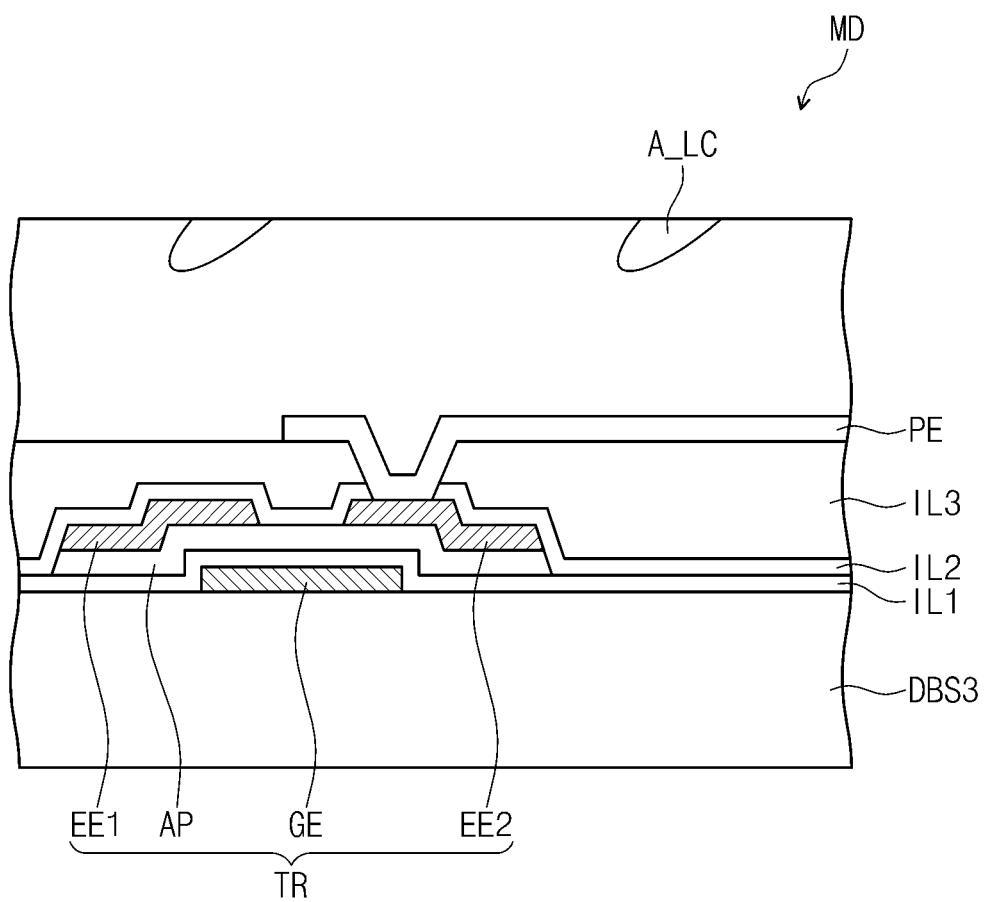
FIG. 9 is an enlarged cross-sectional view illustrating an MD area in FIG. 8.

FIG. 8 is a cross-sectional view of another exemplary embodiment of the display panel taken along line I-I' in FIG. 2, and FIG. 9 is an enlarged cross-sectional view illustrating an MD area in FIG. 8.

Referring to FIGS. 2, 8, and 9, the display device DD may further include an auxiliary liquid crystal layer A_LC disposed within the empty space in the overlap region OA, and a pixel electrode PE for applying an electric field to the auxiliary liquid crystal layer A_LC. The auxiliary liquid crystal layer A_LC may include a plurality of liquid crystal molecules of which the arrangement is changed according to an electric field generated by the pixel electrode PE and a common electrode CEa, which are disposed in the overlap region OA.

According to this embodiment, it is possible to display images even in a region in which the first display panel DP1 and the second display panel DP2 overlap each other. Therefore, each of the first metal layer ML1 of the first substrate unit DP1a and the second metal layer ML2 of the third substrate unit DP2a may extend to the outside of the sealant SE.

In FIG. 9, an enlarged view of a portion of the second metal layer ML2 is illustrated. The second metal layer ML2 further includes a thin film transistor TR in addition to the second gate line GL1 (refer to FIG. 3) and the second data line DL2 (refer to FIG. 3). The thin film transistor TR includes a gate electrode GE, an active pattern AP, a first electrode EE1, and a second electrode EE2. The active pattern AP may be disposed above the gate electrode GE, with a first insulating layer IL1 being disposed therebetween. The first electrode EE1 is branched from the second data line DL2 to contact the active pattern AP, and the second electrode EE2 is spaced apart from the first electrode EE1 to contact the active pattern AP.

A second insulating layer IL2 covers the thin film transistor TR, a third insulating layer IL3 is disposed on the second insulating layer IL2. The pixel electrode PE is disposed on the third insulating layer IL3, and is brought into contact with the second electrode EE2 via a contact hole defined through the second insulating layer IL2 and the third insulating layer IL3.

According to this embodiment, it is possible display images even in a region in which two different display panels overlap each other. Therefore, images may be displayed even between a display region of the first display panel DP1 and a display region of the second display panel DP2. Since images are displayed even in a region in which the first display panel DP1 and the second display panel DP2 overlap each other, visibility of the boundary between the first display panel DP1 and the second display panel DP2 may be reduced.

Figure 10:
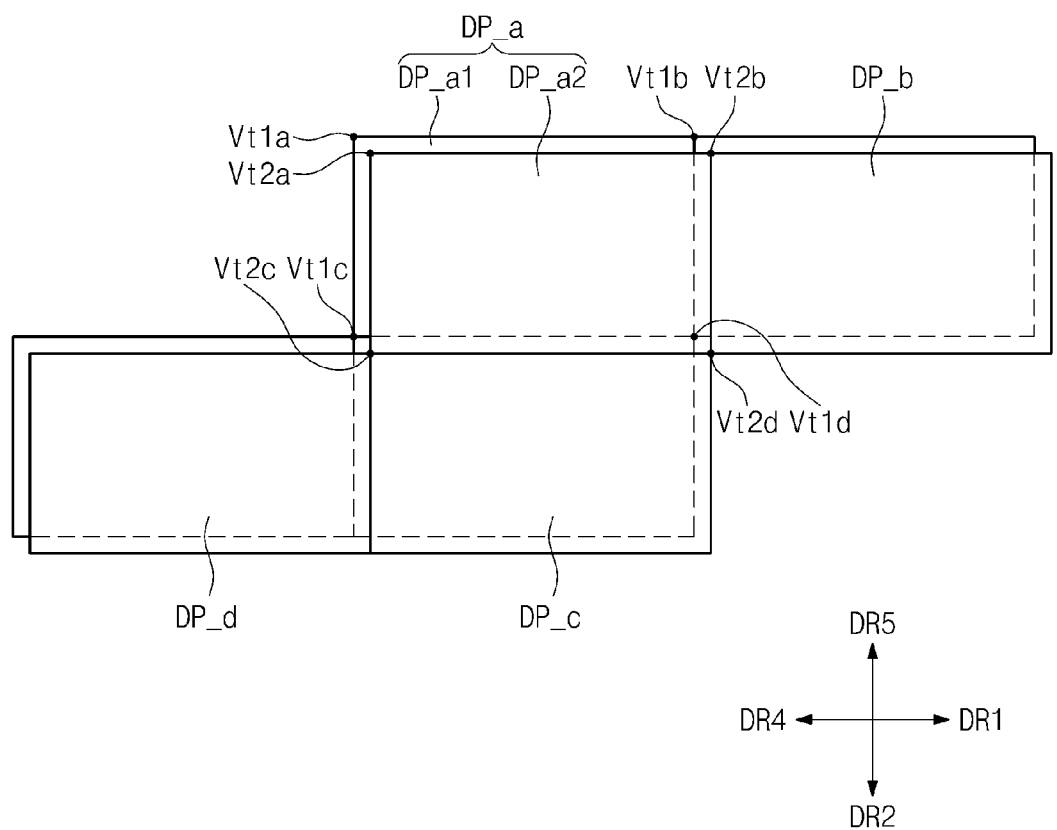
FIG. 10 is a plan view illustrating an exemplary embodiment of using a display panel according to the invention.

FIG. 10 is a plan view illustrating an example using a display panel according to an exemplary embodiment of the invention.

Referring to FIG. 10, a first display panel DP_a includes a first base substrate DP_a1 and a second base substrate DP_a2. Each of the first base substrate DP_a1 and the second base substrate DP_a2 has a rectangular shape. The first base substrate DP_a1 may include four vertices Vt1a, Vt1b, Vt1c, and Vt1d, and the second base substrate DP_a2 may include four vertices Vt2a, Vt2b, Vt2c, and Vt2d. In a plan view, one vertex Vt1d among the four vertices Vt1a, Vt1b, Vt1c, and Vt1d of the first base substrate DP_a1 may overlap the second base substrate DP_a2. Also, In the plan view, one vertex Vt2a among the four vertices Vt2a, Vt2b, Vt2c, and Vt2d of the second base substrate DP_a2 may overlap the first base substrate DP_a1.

The first base substrate DP_a1 may include two edges extending in a first direction DR1, and the other two edges extending in a second direction DR2 orthogonal to the first direction DR1. The second base substrate DP_a2 may include two edges extending in the first direction DR1, and the other two edges extending in the second direction DR2. Second to fourth display panels DP_b, DP_c, and DP_d may also have the same shape as the first display panel DP_a.

The second base substrate DP_a2 may be shifted in a predetermined direction with respect to the first base substrate DP_a1, and a region in which the first base substrate DP_a1 and the second base substrate DP_a2 do not overlap each other may overlap another adjacent display panel.

According to this embodiment, in a plan view, two edges of the first base substrate DP_a1 do not overlap the second base substrate DP_a2, and two edges of the second base substrate DP_a2 do not overlap the first base substrate DP_a1. On the basis of one display panel, even when another display panel is disposed in parallel with the one display panel in the first direction DR1, in the second direction DR2, in a fourth direction DR4 exactly opposite to the first direction DR1, and a fifth direction DR5 exactly opposite to the second direction DR2, the one display panel and the other display panel may overlap each other.

According to this embodiment, the first to fourth display panel DP_a, DP_b, DP_c, and DP_d may be coupled to each other in various directions. In an exemplary embodiment, the second display panel DP_b may be disposed in parallel with the first display panel DP_a in the first direction DR1, for example. The third display panel DP_c may be disposed in parallel with the first display panel DP_a in the second direction DR2. The fourth display panel DP_d may be disposed in parallel with the third display panel DP_c in the fourth direction DR4 exactly opposite to the first direction DR1. Therefore, various types of display devices, as well as a rectangular-shaped display device may be implemented using the first to fourth display panels DP_a, DP_b, DP_c, and DP_d.

According to embodiments of the invention, the display device includes a plurality of display panels. Among the plurality of display panels, adjacent display panels are coupled to each other while overlapping each other. Therefore, the invention is capable of minimizing a non-display region between adjacent display panels While the invention have been described with reference to preferred embodiments thereof, it will be understood that those skilled in the art or those of ordinary skill in the art can make various modifications and variations of the invention without departing from the spirit and scope of the invention as set forth in the appended claims. Therefore, the scope of the invention is not limited to the features described in the detailed description, but should be determined by the appended claims.

What is claimed is:

1. A display device comprising:
    a first display panel including a first base substrate, a first metal layer disposed on the first base substrate, and a second base substrate facing the first base substrate, the first metal layer disposed between the first base substrate and the second base substrate;
    a second display panel including a third base substrate disposed on the same plane on which the first base substrate is disposed, a second metal layer disposed on the third base substrate, and a fourth base substrate facing the third base substrate and disposed on the same plane on which the second base substrate is disposed, the second metal layer disposed between the third base substrate and the fourth base substrate; and
    a first conductive tape disposed on the first base substrate and the third base substrate in an overlap region, wherein
    the second base substrate is divided into a first region overlapping the first base substrate and a second region non-overlapping the first base substrate,
    the third base substrate is divided into a third region overlapping the fourth base substrate and a fourth region non-overlapping the fourth base substrate,
    the overlap region, in which the second region and the fourth region overlap each other, is defined between the first region and the third region in the plan view, and
    the second display panel is disposed on one side of the first display panel in a plan view, and the second base substrate and the third base substrate partially overlap each other when the first display panel and the second display panel are seen from a thickness direction thereof.

2. The display device of claim 1, wherein
    the first metal layer includes a first gate line extending in a first direction and a first data line extending in a second direction intersecting the first direction,
    the second metal layer includes a second gate line extending in the first direction and a second data line extending in the second direction, and
    the first display panel and the second display panel are disposed in parallel in the first direction, and the first gate line and the second gate line are electrically connected to each other.

3. The display device of claim 2, further comprising a third display panel including:
    a fifth base substrate disposed on the same plane on which the first base substrate is disposed;
    a sixth base substrate facing the fifth base substrate; and
    a third metal layer disposed between the fifth base substrate and the sixth base substrate,
    wherein the first display panel and the third display panel are disposed in parallel in the second direction, and the second base substrate and the fifth base substrate partially overlap each other.

4. The display device of claim 3, wherein the third metal layer includes a third gate line extending in the first direction and a third data line extending in the second direction, and the first data line and the third data line are electrically connected to each other.

5. The display device of claim 4, further comprising a second conductive tape disposed on the first base substrate and the fifth base substrate, wherein the second conductive tape electrically connects the first data line and the third data line.

6. The display device of claim 2, wherein the first conductive tape electrically connects the first gate line and the second gate line.

7. The display device of claim 1, wherein:
    the first base substrate has a rectangular shape;
    the second base substrate disposed on the first base substrate has a rectangular shape; and
    a liquid crystal layer disposed between the first base substrate and the second base substrate,
    wherein,
    one vertex among four vertices of the first base substrate overlaps the second base substrate, and remaining three vertices among the four vertices do not overlap the second base substrate in the plan view, and
    one vertex among four vertices of the second base substrate overlaps the first base substrate, and remaining three vertices among the four vertices do not overlap the first base substrate in the plan view.

8. The display device of claim 7, wherein the first base substrate includes two edges extending in a first direction and the other two edges extending in a second direction orthogonal to the first direction, and the second base substrate includes two edges extending in the first direction and the other two edges extending in the second direction.

9. A tiled display device comprising a first display panel and a second display panel, wherein
    the first display panel includes:
    a first substrate unit including a first base substrate, a first gate line disposed on the first base substrate, and a first data line disposed on the first base substrate; and
    a second substrate unit including a second base substrate, disposed on the first substrate unit and shifted in a predetermined direction with respect to the first substrate unit in a plan view, thereby being divided into a first region overlapping the first substrate unit and a second region non-overlapping the first substrate unit, and
    the second display panel includes:
    a third substrate unit including a third base substrate, a second gate line disposed on the third base substrate, and a second data line disposed on the second base substrate; and
    a fourth substrate unit including a fourth base substrate, disposed on the third substrate unit and shifted in a predetermined direction with respect to the third substrate unit in the plan view, thereby partially overlapping the third substrate unit, wherein the third base substrate is divided into a third region overlapping the fourth substrate unit and a fourth region non-overlapping the fourth substrate unit in the plan view, and the second region partially overlaps the fourth region in the plan view, and further comprising a conductive tape disposed in an overlap region, wherein the conductive tape is adhered to the first substrate unit and the third substrate unit, and wherein the overlap region, in which the second region and the fourth region overlap each other, is defined between the first region and the third region in the plan view.

10. The tiled display device of claim 9, wherein the first display panel is adjacent to and disposed next to the second display panel, the third substrate unit is disposed next to the first substrate unit, the second substrate unit is disposed on the first substrate unit and the third substrate unit, and the fourth substrate unit is disposed next to the second substrate unit and on the third substrate unit.

11. The tiled display device of claim 9, wherein the conductive tape electrically connects the first gate line of the first substrate unit and the second gate line of the third substrate unit, or electrically connects the first data line of the first substrate unit and the second data line of the third substrate unit.

* * * * *